E. P. MORONG.
BAIL FASTENINGS.
No. 191,248.                      Patented May 29, 1877.
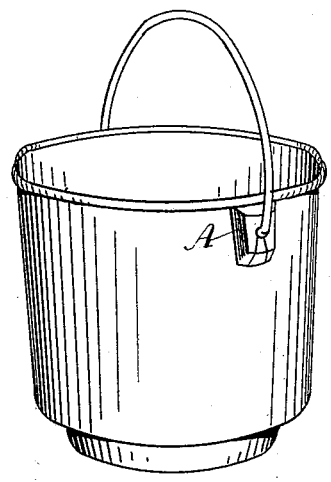
Fig. 1
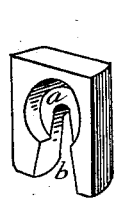
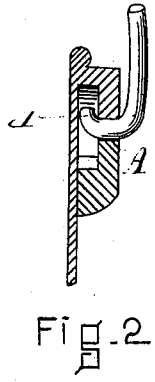
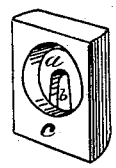
Fig. 2
Fig. 3                                Fig. 4
WITNESSES
Frank G. Parker
F. F. Raymond 2nd
INVENTOR
E. P. Morong

UNITED STATES PATENT OFFICE.

EDWIN P. MORONG, OF BOSTON, MASSACHUSETTS.

IMPROVEMENT IN BAIL-FASTENINGS.

Specification forming part of Letters Patent No. 191,248, dated May 29, 1877; application filed April 19, 1877.

*To all whom it may concern:*

Be it known that I, EDWARD P. MORONG, of Boston, in the county of Suffolk and State of Massachusetts, have invented an Improvement in Bail-Fastenings, of which the following is a specification:

This invention consists in casting upon, or otherwise securing to, each side of the vessel a boss having an inferior cavity provided with a wedge-shaped recess or opening, into which the ends of the bail are hooked, and to which they are fastened by plugs, or their equivalent, as will be hereinafter explained.

A perspective of a kettle, showing one boss and the end of the bail locked therein, is shown in Figure 1. A cross-section of the boss is represented in Fig. 2, which represents the detail of construction; and Fig. 3 or 4 show the interior of the boss before the plug is inserted.

The boss A is cast as shown in Figs 3 and 4, with an interior cavity, $a$, from which opens a wedge-shaped recess, $b$, extending to the exterior of the boss vertically, as shown, or horizontally. In some instances it may be desirable to leave the re-enforcing-bar $c$ across the recess.

The end $d$ of the bail may be formed into a hook, as shown in Fig. 2, in which case it is somewhat flattened at its end; or it may be curved at right angles and its end upset.

Of course, in all cast-metal ware the bosses are cast thereon, and the cavities and recesses formed by suitable cores.

The ends of the bail are locked in the bosses by the plugs $e$, which are made of any suitable material, though preferably of soft metal. If the boss is cast without the bar $c$ the plug is recessed at the inner end, as shown.

Of course, various equivalents may be used for the wedge-shaped recess and the wedge—such as pins alone, or blocks held in place by pins, or slipped into position over a projection of the boss shaped to receive it; but it is found, in practice, that the cavity and recess can best be cast by making the base of the recess flaring, and gradually drawing in the sides, and again enlarging the upper end of the recess to form a cavity, in which the ends of the bail may freely turn.

The advantages of this invention are in the simplicity of construction, its strength, and cheapness.

I claim and desire to secure by Letters Patent—

1. The bail-fastening described, the same consisting of a boss having a cavity, $a$, to receive the bail end, and a wedge-shaped recess opening from said cavity, for the reception of a locking device, substantially as shown.

2. The combination of a boss having an interior cavity, $a$, and a recess, $b$, opening into the same from the exterior of the boss, with the bail $d$ and plug $e$, substantially as described.

E. P. MORONG.

Witnesses:
F. F. RAYMOND, 2d,
A. J. OETTINGER.